US008892461B2

(12) United States Patent
Lau et al.

(10) Patent No.: US 8,892,461 B2
(45) Date of Patent: Nov. 18, 2014

(54) MOBILE DEVICE USER BEHAVIOR ANALYSIS AND AUTHENTICATION (71) Applicants: Alvin Lau, Palo Alto, CA (US); Sam Song Liang, Palo Alto, CA (US); Jun Yang, Milpitas, CA (US)

(72) Inventors: Alvin Lau, Palo Alto, CA (US); Sam Song Liang, Palo Alto, CA (US); Jun Yang, Milpitas, CA (US)

(73) Assignee: Alohar Mobile Inc., Palo Alto, CA (US)

( * ) Notice: Subject to any disclaimer, the term of this patent is extended or adjusted under 35 U.S.C. 154(b) by 106 days.

(21) Appl. No.: 13/681,588

(22) Filed: Nov. 20, 2012

(65) Prior Publication Data
US 2013/0102283 A1 Apr. 25, 2013

Related U.S. Application Data (63) Continuation-in-part of application No. 13/278,396, filed on Oct. 21, 2011, now Pat. No. 8,725,569.

(60) Provisional application No. 61/562,644, filed on Nov. 22, 2011.

(51) Int. Cl.
G06Q 30/00 (2012.01)
H04W 12/06 (2009.01)
G06Q 30/02 (2012.01)
H04W 4/02 (2009.01)
H04W 4/00 (2009.01)

(52) U.S. Cl.
CPC .......... H04W 12/06 (2013.01); G06Q 30/0261 (2013.01); G06Q 30/0269 (2013.01); G06Q 30/0251 (2013.01); H04W 4/02 (2013.01); H04W 4/008 (2013.01); H04W 4/028 (2013.01); G06Q 30/0241 (2013.01)

USPC .................. 705/14.66; 705/14.58; 705/14.49; 705/14.4

(58) Field of Classification Search
CPC .................................... G06Q 30/0269
USPC ....................................... 705/14.66
See application file for complete search history.

(56) References Cited

U.S. PATENT DOCUMENTS 6,917,940 B1 7/2005 Chen et al.
6,975,873 B1 12/2005 Banks et al.
(Continued)

FOREIGN PATENT DOCUMENTS

KR 10-2008-0119603 6/2010

OTHER PUBLICATIONS

Using GPS to Learn Significant Locations and Predict Movement Across Multiple Users; Daniel Ashbrook and Thad Starner, College of Computing, Georgia Institute of Technology, Oct. 2003.

(Continued)

Primary Examiner — John G Weiss
Assistant Examiner — Scott C Anderson
(74) Attorney, Agent, or Firm — Brian R. Short (57) ABSTRACT Methods, systems and apparatuses for authenticating a user of a mobile device are disclosed. One method includes tracking a plurality of locations of the mobile device, tracking motion behavior of the mobile device, and generating a user profile for the user over a period of time based on the tracked plurality of locations and the tracked motion behavior. A present user of the mobile device is authenticated based on a comparison of the user profile with a present user profile of the present user, wherein the present user profile comprises recent location information of the mobile device and recent motion behavior of the mobile device.

19 Claims, 7 Drawing Sheets (56) References Cited

U.S. PATENT DOCUMENTS

| | | |
|---|---|---|
| 7,483,946 B2 | 1/2009 | Boyd |
| 8,725,569 B2 * | 5/2014 | Liang et al. ............... 705/14.66 |
| 2002/0111172 A1 | 8/2002 | Dewolf et al. |
| 2003/0040946 A1 | 2/2003 | Sprenger et al. |
| 2003/0176931 A1 | 9/2003 | Pednault et al. |
| 2007/0219706 A1 | 9/2007 | Sheynblat |
| 2008/0214210 A1 | 9/2008 | Rasenen et al. |
| 2008/0215557 A1 | 9/2008 | Ramer et al. |
| 2009/0177384 A1 | 7/2009 | Walder |
| 2010/0041378 A1 | 2/2010 | Aceves et al. |
| 2010/0073201 A1 | 3/2010 | Holcomb et al. |
| 2010/0125406 A1 | 5/2010 | Prehofer |
| 2010/0185518 A1 * | 7/2010 | Higgins et al. ............ 705/14.58 |
| 2010/0217525 A1 * | 8/2010 | King et al. .................. 701/300 |
| 2010/0229190 A1 | 9/2010 | Koo et al. |
| 2010/0250136 A1 | 9/2010 | Chen |
| 2011/0143777 A1 | 6/2011 | Kim et al. |
| 2011/0153367 A1 * | 6/2011 | Amigo et al. .................... 705/4 |
| 2011/0161427 A1 | 6/2011 | Fortin et al. |
| 2011/0181517 A1 | 7/2011 | Orr et al. |
| 2011/0184640 A1 | 7/2011 | Coleman et al. |
| 2011/0238289 A1 | 9/2011 | Lehmann et al. |
| 2011/0239158 A1 | 9/2011 | Barraclough et al. |
| 2011/0313649 A1 | 12/2011 | Bales et al. |

OTHER PUBLICATIONS

Mining Personally Important Places from GPS Tracks; Changqing Zhou, Nupur Bhatnagar, Shashi Shekhar, Loren Terveen, Department of Computer Science and Engineering, University of Minnesota, Apr. 2007.

Extracting Places and Activities from GPS Traces Using Hierarchical Conditional Random Fleids, Lin Liao Dieter Fox Henry Kautz; Department of Computer Science & Engineering University of Washington, Jan. 2007.

Mining Significant Semantic Locations From GPS Data, Xin Cao† Gao Cong† Christian S. Jensen, School of Computer Engineering. Nanyang Technological University Singapore, Sep. 2010.

Mining GPS Data for Extracting Significant Places, G. Agamennoni, J. Nieto, E. Nebot, Austrialian Center for Field Robotics, University of Sydney, Australia, May 2009.

Learning Significant User Locations with GPS and GSM, Depatmet of Electrical Engineering and Computer Science, Massachusetts Institute of Technology, Sep. 2006.

* cited by examiner

MOBILE DEVICE USER BEHAVIOR ANALYSIS AND AUTHENTICATION

RELATED APPLICATIONS

This patent application is a continuation-in-part (CIP) of U.S. patent application Ser. No. 13/278,396, titled "Location Based User Behavior Analysis and Applications", filed Oct. 21, 2011, and further claims priority to US Provisional Patent Application Ser. No. 61/562,644, filed on Nov. 22, 2011, which are both herein incorporated by reference.

FIELD OF THE DESCRIBED EMBODIMENTS

The described embodiments relate generally to mobile devices. More particularly, the described embodiments relate to methods, systems and apparatuses for user behavior analysis and authentication of a user of a mobile device.

BACKGROUND

Credit card companies currently utilize fraud detection and transaction authorization systems based on detecting "unusual" transaction activities, such as transactions originating from geographic areas that the credit card holder has never been to before, or geographic areas where there has been a high incidence of credit card fraud. Credit card companies may also block transactions if the product/service, price and/or transaction volume is deemed "unusual" given the credit card holder's past transaction history. As credit card and other payments companies employ mobile devices as mobile payment devices, they will use similar fraud detection and transaction authorization approaches.

There are a number of problems with the above solution to credit card fraud detection and transaction authorization. First, these authorizations suffer from a high number of false positives. That is, red flags triggered for transactions which are "unusual" but indeed legitimate. For example, the card holder may have been traveling outside his/her normal geographic area, or buying a unique gift for someone else. Second, when credit card companies block transactions which were indeed intended by the authorized cardholder, everyone loses in the value chain: a) the cardholder is embarrassed or dissatisfied that his/her transaction is blocked, b) the merchant loses a sale, c) the card issuing bank loses a transaction, and the d) the credit card processing company loses a transaction. Third, these transactions can also suffer from a high number of false negatives, which are caused by incorrectly authorizing fraudulent transactions. A criminal may use a stolen credit card in the usual geographic area as the legitimate owner of the credit card, in which case the existing system authorizes the transactions wrongfully. Finally, when fraudulent transactions are authorized, the credit card company, bank, retailer, and the legitimate card holder all lose. The credit card company has to spend large amounts of time and money to investigate and possibly write off the loss, and the credit card holder has to spend time to clear his/her name and may suffer credit score damage.

It is desirable to have a method, apparatus and system for monitoring a mobile device user's behavior and to provide authentication of the user of the mobile device.

SUMMARY

An embodiment includes a method of authenticating a user of a mobile device. The method includes tracking a plurality of locations of the mobile device, tracking motion behavior of the mobile device, and generating a user profile for the user over a period of time based on the tracked plurality of locations and the tracked motion behavior. A present user of the mobile device is authenticated based on a comparison of the user profile with a present user profile of the present user, wherein the present user profile comprises recent location information of the mobile device and recent motion behavior of the mobile device. For an embodiment, the user profile further includes tracking absolute timing of operations of the mobile device, and tracking relative timing of operations of the mobile device.

Another embodiment includes a mobile device. The mobile device includes a plurality of sensors and a processor. The processor is operative to receive location and motion information from the plurality of sensors, track a plurality of locations of the mobile device, track motion behavior of the mobile device, generate a user profile for the user over a period of time based on the tracked plurality of locations and the tracked motion behavior, and authenticate a present user of the mobile device based on a comparison of the user profile with a present user profile of the present user, wherein the present user profile comprises recent location information of the mobile device and recent motion behavior of the mobile device.

Other aspects and advantages of the described embodiments will become apparent from the following detailed description, taken in conjunction with the accompanying drawings, illustrating by way of example the principles of the described embodiments.

DETAILED DESCRIPTION

The described embodiments include methods, systems and apparatuses for location and motion based user behavior analysis, user profile analysis, and user authentication. At least some of the described embodiments provide apparatuses and methods that generate a location, motion and time based user profile of a mobile device user, and further, provides authentication of a present user based on the user profile. Further, security of the mobile device, or associated with the mobile device can be adaptively adjusted based on the authentication.

The described embodiments include monitoring and tracking of location information, motion information and temporal information of a user of a mobile device. The monitored information is used to create a profile of the user of the mobile device. Once a profile has been created, the profile can be used to authenticate a present user of the mobile device.

For an embodiment, authentication provides a confidence level in whether the present user is the user of the mobile device. For at least some embodiments, the authentication includes levels, wherein the levels indicate a confidence in the authentication. For an embodiment, the authentication is used to identify the present user as the registered user of the mobile device. For example, the embodiments of identifying the user can replace other forms of identifying a person (registered user) such as, a driver's license or passport photo, thumb print, biometric fingerprint, etc. That is, the authentication provides a process in which the profile of the user that was created based on past location information (such as, series of locations or paths of location, or types of locations of the user), past motion information (such as, motion patterns, motion patterns association with the user while the user is traveling along the paths of location, or motion association with certain types of locations), and past temporal information (such as, times of day, week, month, year that locations are visited, times of day, week, month, year certain types of motion patterns are observed, relative timing between locations of the user) is used to authenticate the present user. That is, the same types of location/motion/temporal information can be compared between the profile of the registered user and the observed information of the present user to authenticate the present user. Once the authentication has been completed, a confidence level can be established that represents a level of confidence that the present user is the registered user of the mobile device.

For an embodiment, the authentication is used to provide security of the mobile device, or security associated with the user of the mobile device. For example, the security can include an access code that is progressively more difficult depending on the level of confidence that the present user is the registered user. For another embodiment, the level of confidence is used to adjust the level of security of a network being accessed by the mobile device. For another embodiment, the level of confidence is used to provide or not provide access to a physical structure like an office building or a home. For another embodiment, the level of confidence is used to provide or not provide access to a vehicle such as a car of the registered user. For another embodiment, the level of confidence is used to provide or not provide access to an online account, website account, computer account or mobile account of the registered user.

For another embodiment, the level of confidence is used to allow or not allow, or require additional information in order for the present user to conduct commerce. For example, if the mobile device is being used as a form of identification for the use of a credit card, the merchant may require the present user to provide additional identification information. If the present user is attempting to conduct ecommerce, the ecommerce merchant may require the present user to provide additional electronic identification information. Again, all of these can be adjustable depending upon the level of confidence of the authentication process that the present user is actually the registered user of the mobile device.

At least some embodiments of the location information of the user (registered and/or present) include points of interest. For the descriptions here, at least some embodiments of a point of interest (POI) are defined as a specific point location or place that someone may find useful or interesting. There can be at least two types of POIs: public POIs (e.g. stores, parks) that one can obtain from POI database services, and personal POIs (e.g. home, friend's home) that are personal to a mobile user.

A POI can have several properties, such as latitude and longitude, a name (e.g., Olive Garden), a category (for instance, restaurant), and a subcategory (for example, Italian cuisine). A POI can be of different sizes, and can have a hierarchical structure. For example, a POI can be a big park, such as Yosemite. Inside the park, there can be smaller POIs, such as a hotel or a restaurant. Furthermore, a POI can be associated with an event name (for example, a concert of The Rolling Stones, or a baseball game in a stadium, or a seminar on cooking).

For at least some of the embodiments described, a user stay is defined as an event in which a specific user visits a specific POI at a specific time. For embodiments, each user stay has attributes including reference to the POI, start time of the visit, duration of the visit, and the device (as a proxy of the user) that detects the visit. A user stay can be detected by clustering user location data continuously collected by the mobile device of a user, computing the cluster's centroid, and then matching it to a nearby POI. In addition to its geographical presence, a user stay can include temporal presence, such as events scheduled at the specific POI. For example, the POI like a stadium can have football game on Friday, a concert on Saturday, and a baseball game on Sunday. For at least some embodiments, such an event is defined as an event of interest (EOI), which can be an attribute of a user stay.

For at least some embodiments, the determinations of user stays and the user's points of interest are automatic. That is, user stay and/or POI determination processing is automatically executed without the user proactively or reactively providing input. For some embodiments, the determination of the user's user stays and/or POIs does not require manual input from the user. The processing can be performed in the background, and operate on persistently collected sensor data (optionally uploading the data to a server). For an embodiment, a background processing algorithm determines the user stay and/or POI. Note, all or portions of the user stay and/or POI determination algorithms can run on both mobile client side (the mobile device) and server side (a server connected to the mobile device through a network). Other embodiments include semi-automatic processing in which a user's input or feedback can optionally be included with the processing to improve the process. For example, user inputs, such as correcting or adding or deleting a user stay and/or POI, can be used as important feedback information to boost the performance of overall user stay and/or POI determination processing.

For some embodiments, the processing is performed (at the mobile device and/or at the server) in real-time, and for some embodiments the processing includes post-processing. For real-time processing, the user stay and/or POI determination is made with a short delay (e.g. 10 seconds or a minute) after the user arrives at the user stay and/or POI, with a determination deadline being adaptively specified depending on the application. For post-processing, the user stay and/or POI determination is made beyond the short delay (or without a deadline).

For at least some embodiments, a current state of a user is defined as the user's current location, time and what the user is doing. Furthermore, current state can include user stays of that user within a predetermined time window before a present time, wherein the predetermined time window has variable length dependent upon application requirements and the location behavior being observes. For example, the time window of current state can be past few seconds, past hour, this morning (or afternoon), today, this week, or this month etc. As a result, the location of current state can be the POI (e.g. a restaurant) the user is staying right now if the time window is a few seconds or a larger area (e.g. San Francisco) in case the time window is past few days.

As will be described, the mobile device of the user includes sensors that can sense motion, such as, an accelerometer, light sensor, gyroscope, compass, Bluetooth, Near-Field Communications (NFC), WiFi, and altimeter. Also as will be described, the sensed motion can be used to establish motion information about the user of the mobile device. For at least some embodiments, the motion information includes patterns of motion associated with a mode of transportation pattern (that is, the motion between walking, bicycling, running, and driving are unique), and motion activity pattern (that is, for example, the motion pattern of one user's walk is different than the motion pattern of another user's walk). Further, the motion patterns can be associated with a place visits profile (including location, time of day, day of week, day of year, weekend vs. weekday, holidays, seasons & time duration).

Each of these motion patterns provides a set of very unique (that is, user unique) mobile behavioral fingerprints and footprints. If the device deviates from that profile(s), the described embodiments include, for example, generating a red flag, even if the device never left the user's home or workplace zip code(s). For at least some embodiments, the red flag is generated by the authentication, and for embodiments, influences identification of the user, security of the mobile device, security of access provided to the user of the mobile device, and/or access to commerce (actual face-to-face or ecommerce).

Embodiments include tracking user stays of the user over time, wherein the user stays include at least one location and creating a user profile for the user based at least in part on at least one of an arrival time, a duration or a frequency of visits of the user at each of the user stays. For at least some embodiments, the user profile is defined as the results of location based user behavior analysis. For at least some embodiments, the user profile includes the fundamental statistics, such as the number of visits, the time of visit, and the average and total duration of all visits to one POI. Furthermore, for at least some embodiments the user profile includes location behavior patterns learned from the fundamental statistics. For example, it includes user's location preference, such as which POIs or EOIs a user visits often, at what time of the day and/or day of week, user's location transitions between different POIs, and user preferred routes between POIs according to trail information. For example, the statistical transitions can include one-step location behavior change, such as the user visiting place A after place B, or multi-step location behavior change, visiting place A after place B and then going to place C. In addition, for at least some embodiments, the user profile includes user manually input preferences. The user profile includes characteristics of the user. One characteristic of the user includes a history of locations of interest of the user. For at least some embodiments, the user profile includes the statistics of the categories and subcategories of the POIs and EOIs the user has visited.

For at least some exemplary embodiments, route-based information is defined as the name of each route a user takes, the route usage frequency, the time when the route is usually taken, and the general speed information on the route.

Embodiments include a prediction engine that processes dynamic inputs from the user profile of a user and current state of the user to infer future POIs the user may visit and the routes the user may take. The prediction results can be used for providing targeted information to the user.

Once the profile for a user (such as, a registered user who is the owner of the mobile device) has been created, the profile can be used for authenticating a present user of the mobile device. For an embodiment, the authentication provides a level of confidence that the present user is actually the registered user. For one embodiment, the level of confidence is used for securing the mobile device, securing access of the mobile device, or securing activities, such as ability access to online accounts, or ability to execute ecommerce activities. For an embodiment, the level of confidence is used for identifying the user of the mobile device. As such, the identification can replace other types of personal identification means, such as, a photo ID (for example, a driver's license or a passport).

Once the profile has been created, the user can be provided with targeted information based on the user profile. Additionally or alternatively, a likelihood of confirmation of targeted advertising based on the user profile can be estimated. Additionally, the user profile can be supplemented based at least in part on websites visited by the user.

Embodiments include providing the user with at least one suggestion based on the identified points of interest. For an embodiment, this includes providing the user with at least one suggestion based on at least one predicated future point of interest. For an embodiment, a suggestion is modified based on the user profile. For example, a user profile could be used to determine that a user has already satisfied the condition of the suggestion because profile of the user suggests the user has already visited the appropriate location. Clearly, modifying can include changing or removing the suggestion.

As an example of the use of suggestions, a user's shopping list can be tracked, and the items on the shopping list can be correlated with the shops (special POIs) the user usually visits. When the user is physically close to a shop that has one or more items on the user's shopping list, a suggestion can be generated to remind the user to stop by the shop to purchase the item.

After such a suggestion is generated, the mobile device monitors the user's location history, and if it detects that the user stops at the specific shop, where a specific item on the shopping list has been in one of the suggestions presented to the user, the system can automatically remove the specific items, or reduce the priorities of those items.

Examples of intelligent personal services include spatial suggestions. An exemplary spatial suggestion includes a reminder to a user of a mobile device that is based on spatial information of the mobile device. Reminders include suggestions that are useful to the user. Intelligent personal services include, for example, making health-related suggestions, such as doing more physical activities (e.g. walking) than sitting still. Embodiments of personal services include providing recommendations or suggestions to the user based on the user's habits and interests, for example, kid-centric events during a weekend for people with children. Services can also include commercial services, such as recommending a cheaper gas station near the user's regular commute route.

Location based user behavior analysis can also be useful to a mobile advertiser. For example, after a mobile advertiser has displayed an advertisement to a user, the advertiser would like to determine if the user has been to the merchant in the advertisement and conducted business, and determine if the advertisement has been confirmed. Additionally, advertisers desire user profile information, which enables the advertiser to intelligently send targeted advertisements.

When, for example, the system detects that the user often goes to an elementary school or a child day care center, the system infers that the user may have one or more children, then the system may generate targeted information to the user for child-related events.

Timing analysis of the user that can be included within the profile of the user includes absolute timing of activities, locations and/or motion patterns, and relative timing of the activities, locations and or motion patterns of the user. For example, the absolute timing can include a time of day, day of week, and days of the year, seasons of the year, for example, winter, summer, fall, spring, weekends vs. weekdays, holiday periods.

As will be described, embodiments of the mobile user's mobile device include a motion sensor, for example, an accelerometer (and other sensors, such as the light sensor, gyroscope, compass, and altimeter). A history of motion of the motion device can be tracked/established, that includes, for example, a mode of transportation pattern, and a motion activity pattern. Additionally, location information can be tracked that includes, for example, place visits profile (including location, time of day, day of week, day of year, weekend vs. weekday, holidays, seasons and time duration). The tracked motion and location information provide a set of very unique mobile behavioral fingerprints and footprints. If the device deviates from that profile(s), at least some embodiments include the generation of a red flag, even if the device has never left the user's home or workplace zip code(s).

The system tracks when the user gets gasoline for his car, and tracks the number of miles the user has driven the car after each refill. When the system detects that the user has used most of the gasoline in his tank based on the number of miles driven and the speed, as a result of the road type, such as local streets or high ways, the system can start to find gas station with low prices and make targeted information to the user.

Figure 1:
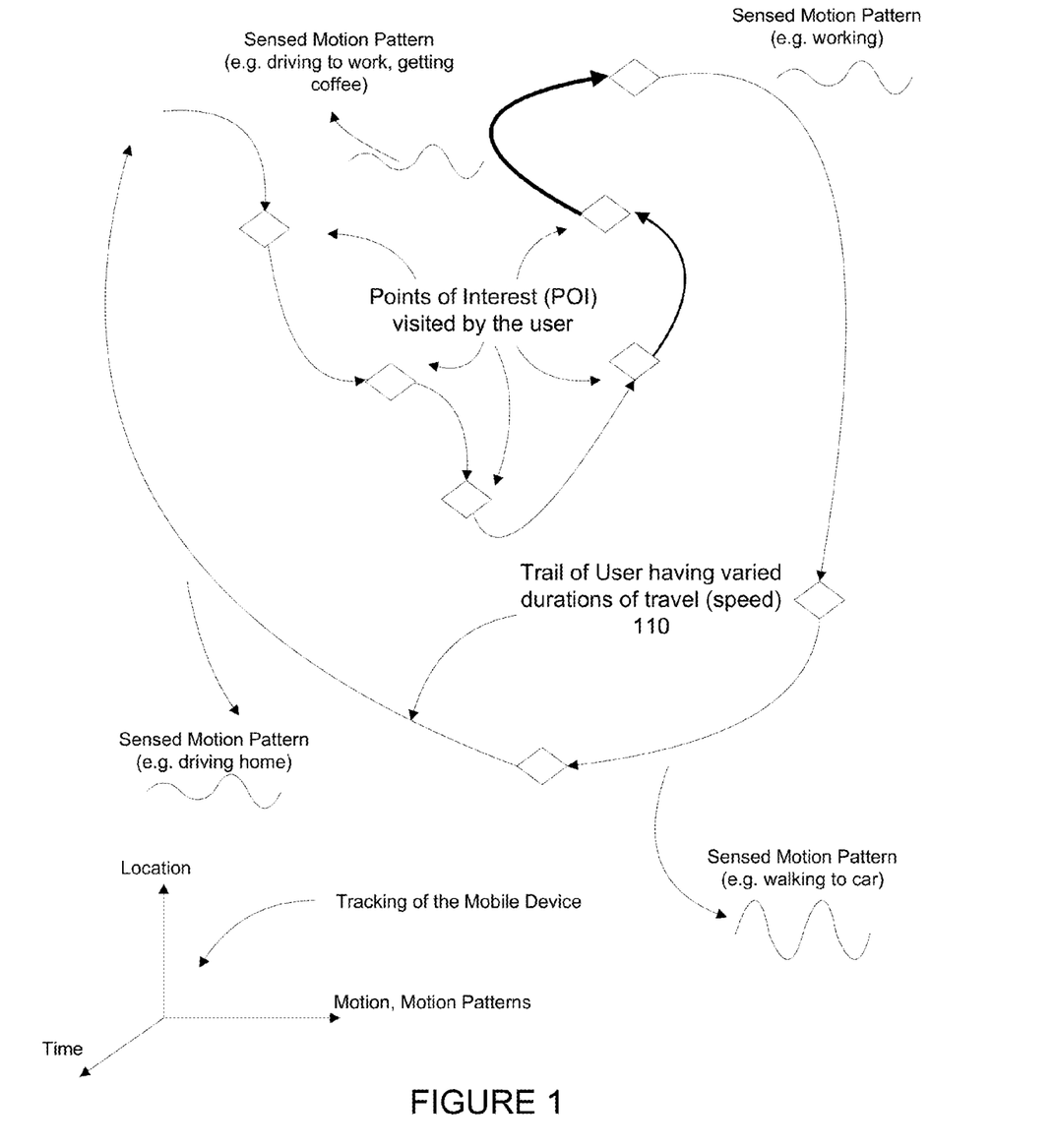
FIG. 1 shows an example of a map that depicts locations traveled by an individual that further depicts points of interest of the user, and monitoring of motion of the user, according to an embodiment.

FIG. 1 shows an example of a map that depicts locations traveled by an individual that further depicts points of interest. A line 110 depicts the locations traveled by the user. During the travels of the user, the user visits various points of interest. Based on the visited locations, additional points of interest can be recommended and/or suggested to the user.

The trail of the user can be marked by differing speeds (depicted by varying thickness of the line 110) of travel between points of interest. The travel speed can be used as one piece of information in the determination of trails of interest.

Additionally, along the travels, motion analysis is performed that identifies motion patterns associated with the travel. For example, a portion of the trail of interest may include the user (with the mobile device) traveling to work. However, the user may stop to buy a newspaper, pick up breakfast, get a cup of coffee and pick up some items. Each of these locations can be tracked, along with the corresponding motion information generated by the mobile device. Further, the user may work, travel from work by foot and then by car. Each of these activities generates distinct location, motion and temporal signatures. The signatures can be unique to the user, and therefore, be used to generate a user profile, which can then be used to authenticate whether a present user of the mobile device is the registered or actual user.

FIG. 1 shows several possible motion signatures generated, for example, from an accelerometer of the mobile device. For an embodiment, the tracking of the mobile device includes at least three possible variables—location, motion and/or time. Clearly, additional variables as will be discussed can be included.

Exemplary motion activities that can be analyzed include vibration patterns, acceleration patterns, speed and frequency of certain movements. Exemplary motion sensors include the user's mobile device's accelerometer, gyroscope, compass, altimeter, changes in WiFi signal strength, changes in the GPS readings, barometric pressure sensor, temperature sensor, microphone sensor, ambient light sensor, Bluetooth chip, NFC sensor, proximity sensor, RGB color sensor, image sensors, humidity sensors, cell-tower signals, biometric sensors, fingerprint sensors, bio-sensors. Additional possible motion sensors include sensing changes in: location, motion, brightness, temperature, environmental sounds, WiFi, Bluetooth, etc.

Examples of motion patterns that can be tracked include, for example, the speed/cadence/pace at which the mobile user normally walks. The speed/cadence/pace at which the mobile user normally walks is a unique biometric signal which can be identified by the accelerometer, gyroscope and/or GPS. Another motion pattern includes the "bounce" of the mobile device in a person's pocket, bag or purse as they walk or run, which is also a unique biometric signal. The motion trail as a person reaches for their mobile device in a pocket (or purse or briefcase) and moves the device to their ear (and the angle they hold the mobile device) is a unique biometric pattern, which can be identified by the accelerometer and gyroscope.

Further, embodiments include tracking the history and pattern of the places (and their categories, for example yoga place, hair salon, Chinese restaurant) a person visits is a unique signal or "fingerprint". Further, embodiments include identifying the mode of transportation the person uses, and the transportation pattern (time of day, day of week, time duration) and what they were doing before and after,—which also provides a unique "fingerprint". The time of day, day of week, and time duration at which the person carries out the activities above is also a unique signal pattern, which can be used to create a "fingerprint" identifier for that person.

A series of points of interest (such as shown in FIG. 1) can be termed a "trail of interest". The trail of interest includes a sequence of location data points. Embodiments of each location data point can include the attributes of latitude, longitude, altitude, speed and/or a timestamp. More specifically, an embodiment of a trail of interest is defined by a plurality of points of interest of the user. For an embodiment, a frequency and/or speed of the user between points of interest is used to determine a level of importance of the trail. For example, if a user travels along one part of a trail (or route) frequently, with low speed (meaning it is a local street, rather than high way), which can be verified by using a geo-database), then some types of services along the this part of the trail can be recommended to the user, with the expectation that it is more likely for the user to use the service, because it is easier for the user to stop by the service. For an embodiment, the level of importance is included within a user profile.

Figure 2:
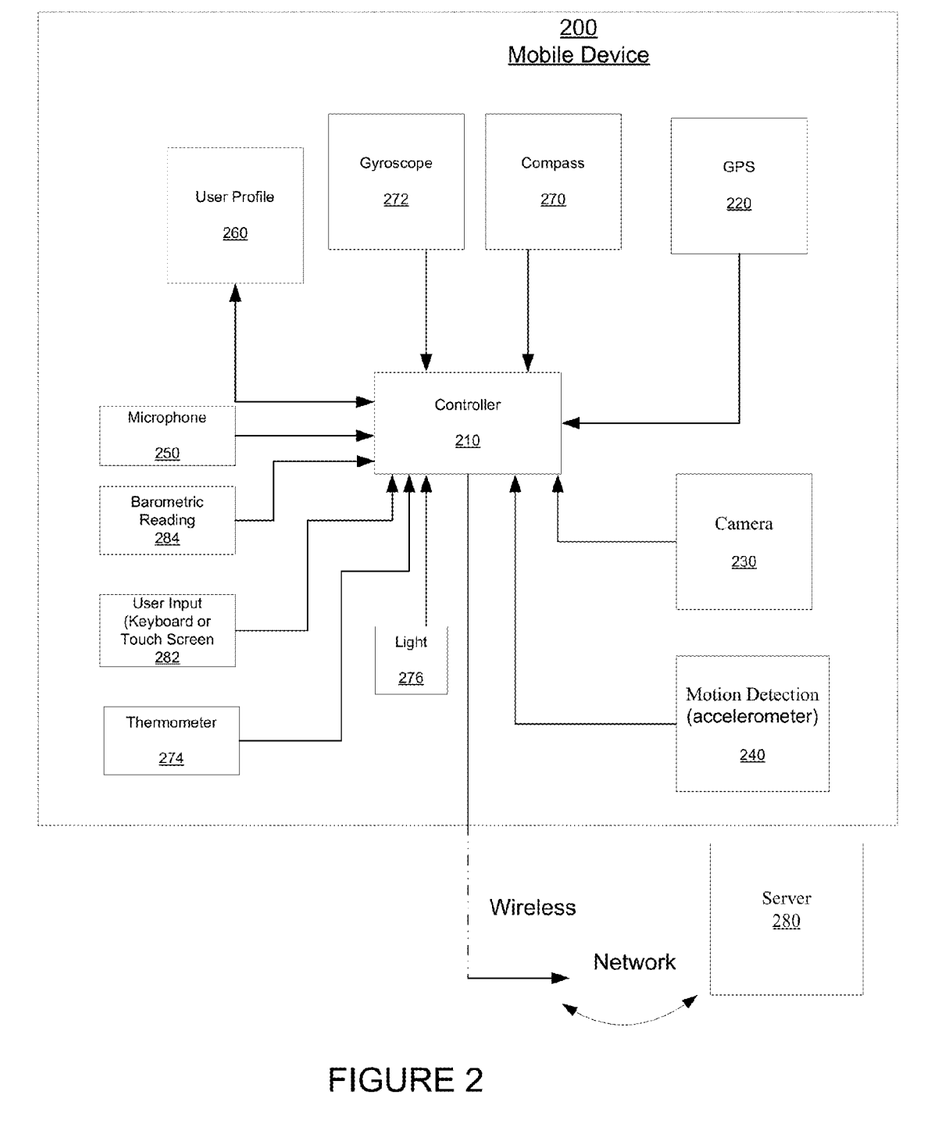
FIG. 2 shows an example of a mobile device that the disclosed embodiments for generating a user profile of the mobile device user are operable, according to an embodiment.

FIG. 2 shows an example of a mobile device that the disclosed embodiments for generating a user profile of the mobile device user are operable. For embodiments, user location data is continuously collected from the mobile device over time. The data can consist of multiple streams of sensor data with timestamps.

Spatial information (such as, longitude, latitude, altitude) of the user can be determined by a location sensing system, such as a global positioning system (GPS), 220 and/or network-based location, such as location determined by cellular and/or WiFi networks of the mobile device 200. Based on the spatial information, a controller 210 (or another controller connected to the controller 210) of the mobile device 200 can roughly determine locations of the user. GPS, however, can be limited because the exact location or the actual business (point of interest) visited by the user may not determinable from GPS alone. Embodiments provide alternate or additional pieces of location information as determined by the controller 210, or a controller electronically connectable to the controller 210.

Signals sensed by a motion sensor (for example, an accelerometer) 240 can be used to provide additional user-related information. That is, for example, the GPS 220 may be precise enough to narrow down the identification of a location of interest to three businesses. The signals generated by the motion sensor 240 can provide an indication of activity of the user, which can be used to additionally identify a location of interest.

For example, when a department store (e.g. Walmart®) is located next to a cafe (e.g. Starbucks®), the user's motion pattern can be used to disambiguate between the two POI (points of interest), Walmart and Starbucks. If the user's motion pattern indicates that the user has been walking around most of the time, then the probability that the user visited the department store is higher. On the other hand, if the user's motion pattern indicates that the user has been sitting still most of the time, then the probability that the user visited the cafe is higher.

Other sensed signals that can be used to refine the user's profile include images generated by a camera, and/or audio signals generated by a speaker. Images captured by a camera 230 of the mobile device 200 can be used to provide additional user-related information. That is, for example, signs on business proximate to the user's location can be used to determined points of interest.

Audio signals sensed by a microphone 250 of the mobile device 200 can be used to provide additional user-related information. That is, for example, loud noise versus quiet noise in the background of a user's location can be used to aid in determination of points of interest. For example, because the noise level in a library is usually low, if the noise level is low, then the probability that the user is in a library is higher than the probability that user is in a restaurant.

Direction of the user can be determined by, for example, a compass 270 of the mobile device 200. The compass 270 can provide present or historical directions of the user. The directions of the user can be used to aid in the determination of points of interest.

Rotation of the user can be determined by, for example, a gyroscope 272 of the mobile device 200. The gyroscope 272 can provide present or historical rotation of the mobile device of that the user carries. The rotation of the mobile device of the user can be used to aid in the determination of points of interest.

An ambient temperature of the user can be determined by, for example, a thermometer 274 of the mobile device 200. The thermometer 274 can provide present or historical ambient temperatures of the user. The temperature of the user can be used to aid in the determination of points of interest. For example, temperature can be used to determined whether the user is or was outside versus inside.

Exposure to ambient light by the user can be determined by, for example, a light sensor 276 of the mobile device 200. The light sensor 276 can provide present or historical light exposure of the user. The light exposure of the user can be used to aid in the determination of points of interest. For example, sensed levels of IR can be used to determine whether the mobile device of the user is, for example, in the user's pocket, and to determine whether the user is in direct sun light.

User-input information can be received from a key-board or touch screen 282. Based on a determination that the user is using the input (key-board or touch screen) behavior if the user can be inferred, and therefore, educated guesses can be made regarding the location of the user. For example, if the user is inputting information, the user is probably not driving. If the user is talking, the user is probably not at a movie theater.

Barometric information from a barometric sensor 284 can be sensed and used to determine user-related information. For example, the barometric information can be used to deduce an altitude of the user, and therefore, be used to determine what floor of a building the user is presently located. GPS can be inaccurate inside of buildings, and therefore, barometric information can be very useful.

A network that the mobile device 200 is connected to, can provide additional user-related information. For example, the network can provide hot spot (for example, WiFi hot spot) location and identification information, or cell tower location information. The connection to the remote server 280 is optional, because the mobile device may be disconnected from the server. In addition, part of the user profile computation can be performed on the mobile device, and may not be required to be run on the server 280. For other embodiments, optional amounts of the authentication processing can be off-loaded to the server 280.

The sensors of the mobile device 200 can be used to generate and/or influence a user profile 260 of the user of the mobile device 200.

Figure 3:
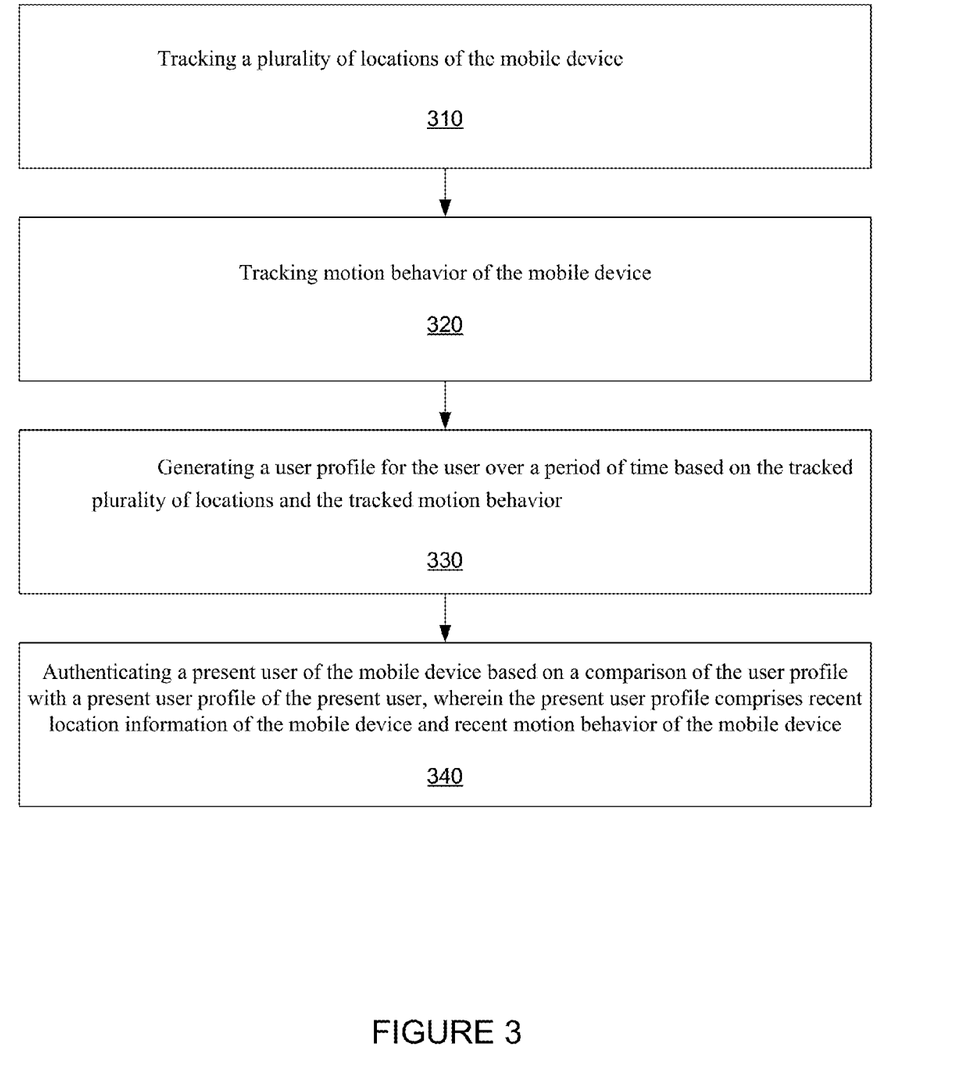
FIG. 3 is a flow chart that includes steps of a method of authenticating a user of a mobile device, according to an embodiment.

FIG. 3 is a flow chart that includes steps of an example of a method of authenticating a user of a mobile device. A first step 310 includes tracking a plurality of locations of the mobile device. A second step 320 includes tracking motion behavior of the mobile device. A third step 330 includes generating a user profile for the user over a period of time based on the tracked plurality of locations and the tracked motion behavior. A fourth step 340 includes authenticating a present user of the mobile device based on a comparison of the user profile with a present user profile of the present user, wherein the present user profile comprises recent location information of the mobile device and recent motion behavior of the mobile device.

For an embodiment, the user profile is generated for the user over a period of time, whereas the present user profile includes recent location information of the mobile device and recent motion behavior of the mobile device. The period of time can be any selectable amount of time that allows for a statistical confidence that the user profile provides a unique signature of the user, wherein the user is, for example, a registered users or an owner of the mobile device. For an embodiment, recent location information and recent motion behavior includes location information and motion information collected within a most recent period of time from the present time, wherein the present time is the time, or proximate to the time in which the authentication is taking place. The most recent time is adaptive, but for an embodiment it includes, for example, the most recent hour, multiple hour, or day. That is, the most recent time is the last running hour of time. For other embodiments, the most recent time can be determined by the motion of the mobile device. For example, since the mobile device was last at rest.

For at least some embodiments, the profile is generated by averaging the tracked plurality of locations and the tracked motion behavior of multiples of the period of time. The period of time is selectable. That is, the period can be selected to be, for example, an hour, a day, a week, month or year. What is important is that the selected period provides confidence in being able to authenticate the present user as the actual or registered user. The period of time can be adaptively selected based on the habits of the user. Very predictable users can be treated differently than unpredictable users.

For an embodiment, the authentication includes a statistical comparison between the user profile with a present user profile of the present user, wherein the present user profile comprises recent location information of the mobile device and recent motion behavior of the mobile device. The statistical analysis can include, for example, determining the standard deviation between the user profile (profile of the registered user) and the profile of the present user (the user presently using the device). The lower the standard deviation, the greater the confidence level that the present user is the registered user.

For an embodiment, the profile (user and/or present user) includes a combination of the location, motion and temporal patterns, since any one type of pattern may not be definitively conclusive. Combining multiple types of patterns leads to a higher level of confidence in the authentication. The registered user will have distinct combinations of sensed location, sensed motion, along with temporal information. The combination of these characteristics is substantially stronger (better) at determining the confidence levels.

For an embodiment, the location patterns include the places the user usually goes to, and in what order. For an embodiment, the temporal patterns include information, such as when the user visits certain places, how often the user visits the places, and how much time the user stays at each place. For example, a combined location and temporal pattern of the user going to dinner then to movie (as distinct from going to the movie first, and then dinner), or user going to a coffee place before some other category of place, can be unique to the user. For at least some embodiments, motion activity patterns include, for example, vibration pattern, acceleration pattern, speed and frequency of certain movements.

For an embodiment, the profile further includes tracking of correlations between the tracked location information and the tracked motion information. Further, authentication includes comparing the tracked correlations. That is, correlations can be identified between the locations of the user, and the motion patterns of the user. As such, the identification of these correlations can additionally be used to authenticate the present user. If a present user generates a profile that includes similar correlations as the correlations identified with the registered user, the confidence level that the present user is the registered user can increase.

For an embodiment, the user profile further includes tracking absolute timing of operations of the mobile device, and tracking relative timing of operations of the mobile device. That is, a user is more likely to visit particular locations, and subject the mobile device to particular motion patterns at certain times of the hour, day, week, month or year. Additionally, certain locations and motion patterns are more likely to be followed by some relative time with other locations and motion patterns. Again, these absolute and relative timed events provide additional elements for authenticating the present user.

An embodiment further includes establishing a level of confidence that the present user of the mobile device is the user of the mobile device, thereby providing a confidence level in identifying the present user of the mobile device as the user of the mobile device. The level of confidence can be utilized for security reasons, or for user identification reasons.

For embodiments, the level of confidence can be used for allowing (or not allowing) access to various access systems, such as computer systems, websites that require logging in, build/door entry, automotive vehicle entry and ignition, and payment systems of various kinds, including credit card. For the credit card example, the level of confidence can be utilized for providing identification of the user. That is, for example, a threshold level of confidence may be required for proper identification of the user. If that threshold is not met, the user may be required to provide additional information allowing for more confidence, and therefore, verifying identification of the user. This is useful, for example, of the user is attempting to use a credit card at a merchant. The merchant can utilized the embodiments of authentication of the user as described. Additionally, the mobile device can confirm that the user is physically at the merchant's location as the user is attempting to use the credit card. Additionally, the mobile device can confirm whether the user is at the billing address and/or shipping address when placing an online order or conducting a purchase at an ecommerce site.

For at least some embodiments, the mobile device (and the described embodiments for authenticating the present user) is used to detect whether the user is physically at the place (home, work) where a computer system is intended to be operated (not a rogue remote breach). For other embodiments, an ecommerce site's goods and products are to be delivered to the authorized (registered) user's real shipping address. The address information can be confirmed because the historic and current information on the mobile device user's physical location includes the user's home address or work address.

As described, the greater the level of authentication, the greater the probability the present user is the user. Essentially, the level of authentication uses mobile behavioral fingerprints and footprints can be used to lower the rate of fraudulent payments, transactions, access control, authentication, and improve fraud detection, and security systems.

For an embodiment, the tracking the plurality of location includes tracking user stays of the user over time, wherein the user stays includes at least one location. For an embodiment, sets of user stays are associated with the user, wherein a set may include the user stays associated with the user.

For an embodiment, the tracking the motion behavior includes at least one motion detector within the mobile device sensing motion of the mobile device over time. The sensed motion is tracked over time. Patterns in the sensed motion are identified over time. For embodiments, the sensed motion include, for example, signals from the user's mobile device's accelerometer, gyroscope, compass, altimeter, changes in WiFi signal strength, changes in the GPS readings, barometric pressure sensor, temperature sensor, microphone sensor, ambient light sensor, Bluetooth chip, NFC sensor, proximity sensor, RGB color sensor, image sensors, humidity sensors, cell-tower readings, biometric sensors, fingerprint sensors, or bio-sensors. Further, the sensed motion signals can include changes in location, brightness, temperature, environmental sounds, WiFi signal strengths and detected hotspots, Bluetooth, and NFC. This is not intended to be an exhaustive list.

For an embodiment, generating the user profile for the user over the time period based on the tracked plurality of locations and the tracked motion behavior includes associating sets of locations with the user, associating sets of motion behavior patterns with the user, and/or associating sets of combinations of motion patterns with particular locations of the sets of locations. As previously stated, associating combinations of motion patterns with particular locations of the sets of locations is substantially more powerful than just associating one or the other. Users typically generate motion patterns that are correlated to the location of the user. Additionally, the locations include POIs or categories of POIs (for example, Starbucks, Peets, Philz are all in the POI category of "coffee place").

For an embodiment, the user profile further includes associating timing of operations of the mobile device with the user, wherein the timing includes absolute timing and relative timing. The absolute time can include, for example, the time of day, day of week, and days of the year, seasons of the year, for example, winter, summer, fall, spring, weekends vs. weekdays, holiday periods. Further, the relative time includes the time between locations and/or motion patterns.

For an embodiment authenticating the present user of the mobile device based on the comparison of the user profile with the present user profile includes determining a relative location match between the sets of location of the user and locations of the present user, determining a relative motion match between the sets of motion of behavior patterns and motion of the present user, determining a relative combination match between the combinations of motion patterns with particular locations of the sets of locations with combinations of the present user, and determining a relative timing match between the timing of operations of the mobile device with timing of the present user. The level of authentication is determined based on the relative location match, the relative motion match, the relative timing match, and the relative combination match.

For an embodiment, determining a relative location match between the sets of location of the user and locations of the present user comprises determining a relative POI category match between the POI categories of the user and the present user.

An embodiment further includes weighting the contribution of the relative location match, the relative motion match, the relative timing match, and the relative combination match in the determination of the level of authentication. That is, the weighting provides for one of the matches providing a greater weighting in the determination of the level of authentication. As previously stated, the level of authentication can determine the confidence level that the present user is the user (registered). Further, another of the matches provides less weighting. For an embodiment, the weighting of each of the relative location match, the relative motion match, the relative timing match, and the relative combination match is adaptive adjusted. For example, the weighting can be adaptive based on the timing within a particular day, season, holiday period, month, or year.

As described, the embodiments provide for determination of unique "fingerprint" identifiers of the user that can be included within the profile of the user of the mobile device to authenticate a present user of the mobile device. For example, speed/cadence/pace at which the mobile user normally walks is a unique biometric signal or indication which can be identified by the accelerometer, gyroscope and GPS of the mobile device. The "bounce" of the mobile device in a person's pocket as they walk or run is a unique biometric signal. The motion trail as a person reaches for their mobile device in a pocket (or purse or briefcase) and moves the device to their ear (and the angle they hold the phone) is a unique biometric pattern, which can be identified by the accelerometer and gyroscope. The history and pattern of the places (and their categories, ie yoga place, hair salon, Chinese restaurant) a person visits is a unique signal or "fingerprint". The mode of transportation the person uses, and the transportation pattern (time of day, day of week, time duration) and what they were doing before and after, is a unique "fingerprint". The time of day, day of week, and time duration at which the person carries out the activities above is also a unique signal pattern, which can be used to create a "fingerprint" identifier for that person.

Once authenticated, the level of authentication, or the confidence level that the present user is the registered user (owner of the mobile device) can be used for adaptively setting a level of security associated with the mobile device. For an embodiment, the security includes securing the mobile device. For an embodiment, the security includes securing a network the mobile device is connected to. For an embodiment, the security includes securing access to a location or another device. For an embodiment, the security determines the access the present user has to secure websites or ecommerce transactions.

Figure 4:
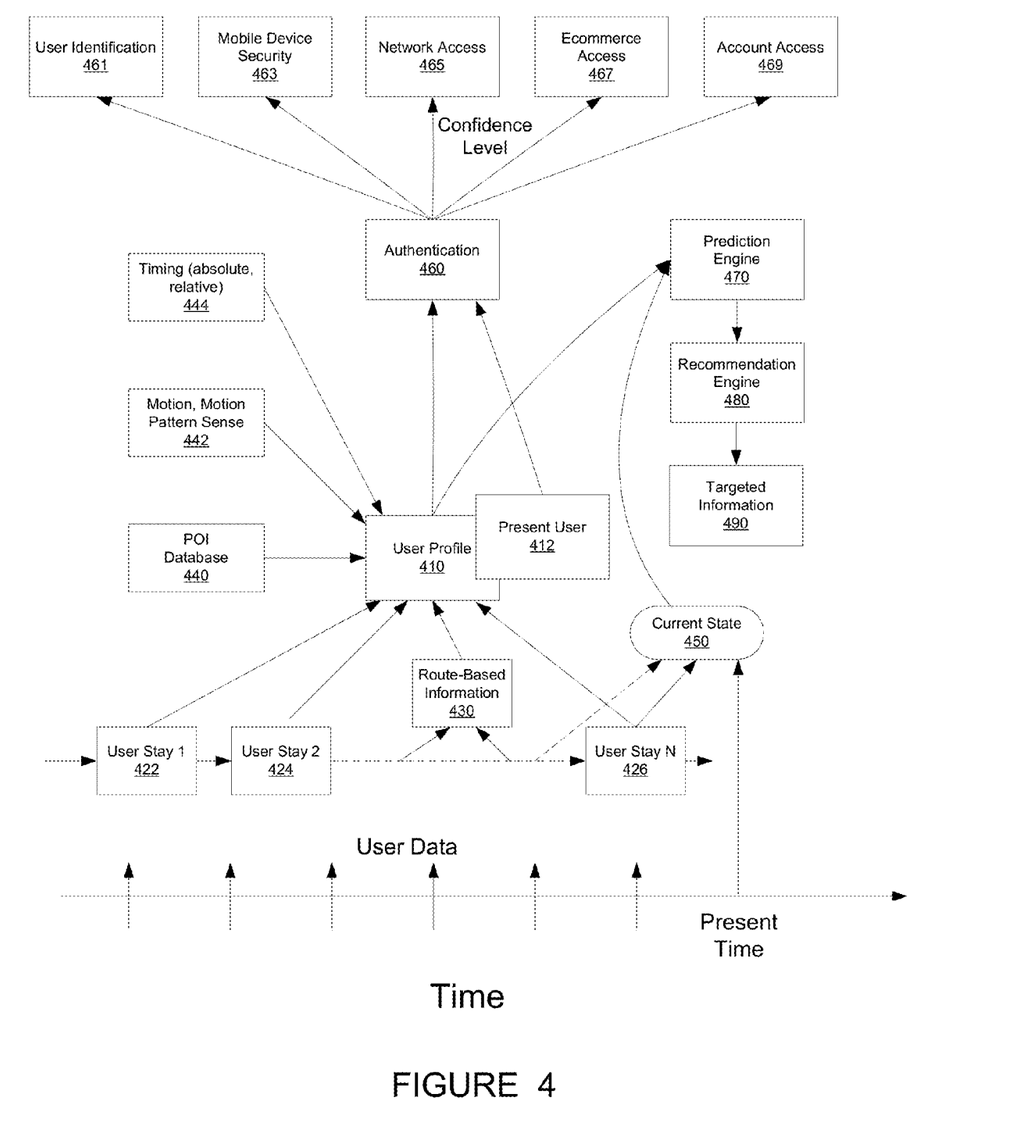
FIG. 4 is a block diagram that illustrates an example of a user profile generation system, according to an embodiment.

FIG. 4 is a block diagram that illustrates an example of a user profile generation and usage system. The previously described user stays (such as, user stays 422, 424, 426) are generated over time by the historical user location data, in which each is referenced to a POI in a POI database 440. Route-based information 430 can be inferred from historical commuting behavior of the user moving from one POI to another POI. Embodiments includes a user profile 410 that is generated and continuously updated based on, for example, POIs from a POI database 440, the user stays 422, 424, 426 and route-based information 430. A user profile 410 (and later, the present user profile 412) is generated by analyzing all user stays of the user and extracting user behavior patterns. The user profile 410 (and later, the present user profile) also receives motion, motion pattern sensing 442, and timing 444 (absolute and/or relative) timing of the location and motion sensing.

The user profile 410 and the later generated present user profile are used by an authentication engine 460 to authenticate the present user of the user of the mobile device. The authentication provides a level of confidence in whether the present user is the user (also referred to as the registered user, who typically is the owner of the mobile device).

The level of confidence generated by the authentication engine 460 can be utilized by a user identification engine 461, a mobile device security engine 463, a network security access engine 465, an ecommerce access engine 467, and/or a user account access engine 469.

In addition to the user profile 410, embodiments further include determining a current state 450 of the user of the mobile device. As shown, an embodiment of the current state is based upon current user stay information 426 and/or recent user stays, and current user data.

Based on the user profile 410 and the current state 450, predictions of the behavior of the user can be made by, for example, a prediction engine 470. Prediction engine 470 takes static inputs from the user profile 410, such as frequently visited POIs and transitional patterns between POIs, and dynamic inputs from the current state 450 to infer the routes the user may take and POIs the user may visit in the future. Based on the predicted behavior, recommendation can be provided to the user via recommendation engine 480 and targeted information 490 can be provided to the user of the mobile device. The prediction engine 470 can be disabled so that the recommendation engine 480 can make targeted information based on the user profile 410 and the current state 450 directly.

An embodiment includes tracking a current state of the user. For embodiments, the current state includes user stays within a predetermined time of a present time, wherein the predetermined time is dependent upon an application of the user device or an observed behavior of a user of the user device.

For at least some embodiments the user profile includes a history of the user stays of the user. For an embodiment, the user stay includes the point of interest the user has visited, an arrival time and a length of time the user stays at the point of interest.

At least some embodiments further include determining route-based information. Further, embodiments include updating a current state of the user based on the route-based information. Another embodiment further includes predicting future user stays based on the route-based information. Embodiments of determining route-based information include determining a plurality of points of interest, wherein the plurality of points of interest define a trail of interest of the user. As previously described, an embodiment a trail of interest is defined by a plurality of points of interest of the user. For an embodiment, a frequency and/or speed of the user between points of interest is used to determine a level of importance of the trail.

At least some embodiments further include providing the user with targeted information base on the user profile. For specific embodiments, the targeted information includes at least one of coupons, advertisement, notices of events. Other embodiments include estimating a likelihood of conversion of targeted advertising based on the user profile, and/or measuring a conversion of targeted advertising based on the user profile. Additionally, a rewards-based program can be facilitated based on the user profile. That is, visits to a merchant can be monitored, and rewards automatically applied based on visits to the merchant.

For an embodiment, the user profile is supplemented based at least in part on websites visited by the user. For one implementation further includes supplementing the user profile based on information posted by the user on at least one of the websites. For another implementation, at least one of the websites comprises a social website.

Embodiments include providing the user with suggestions. For example, one embodiment includes providing the user with at least one suggestion based on identified points of interest. Another embodiment includes providing the user with at least one suggestion based on at least one predicated future point of interest. Further, embodiments include modifying (including changing or removing) a suggestion based on the user location history and user profile.

Figure 5:
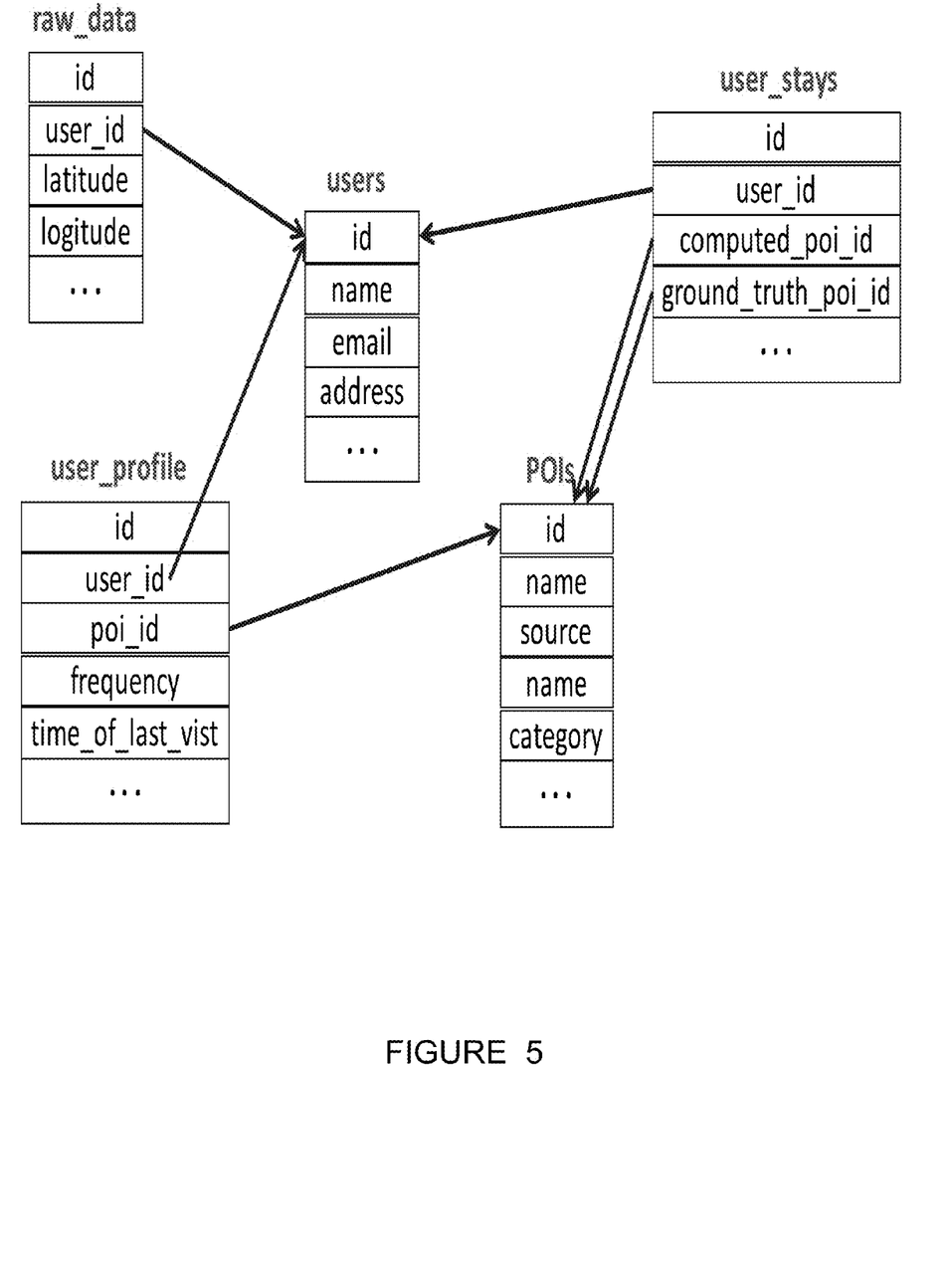
FIG. 5 shows an example of the database schema, according to an embodiment.

FIG. 5 depicts one example of the database schema used in the location behavior system. "users" table is to store information of each user registered with the system. "raw_data" table stores all the sensor data and client state information uploaded to the server by the client running in a device owned by a user. The sensor data can include GPS samples, network location samples, WiFi information, motion, etc. The client state information can include GPS ON/OFF, state transitions and reasons. Each entry in the table has a reference to the user for whom the data was collected. "user_stays" table stores all user stays detected by the system after processing the entries in the raw_data table. A user stay has attributes such as the computed location (i.e. latitude and longitude), start time, duration. More importantly, embodiments of the system try to match a user stay to a POI, which is captured in the "computed_poi_id" column. The match may be wrong, so the system uses "ground truth_poi_id" to refer to the actual POI the user visited based on input from the user. "POIs" table stores all the POI entries used by the system. Note that there are two types of POIs: public POIs (e.g. restaurants) that can be obtained from third party databases, or personal POIs (e.g. homes) that were entered by users manually. The "source" column is used to differentiate these two types. "user_profile" table stores the association between a user and a POI. It's part of the user profiling by the system. Each entry includes attributes such as how frequent the user visits the POI, when was the last visit, typical time/day of the visits, etc. The table is generated by analyzing the data in "user_stays" table.

Figure 6:
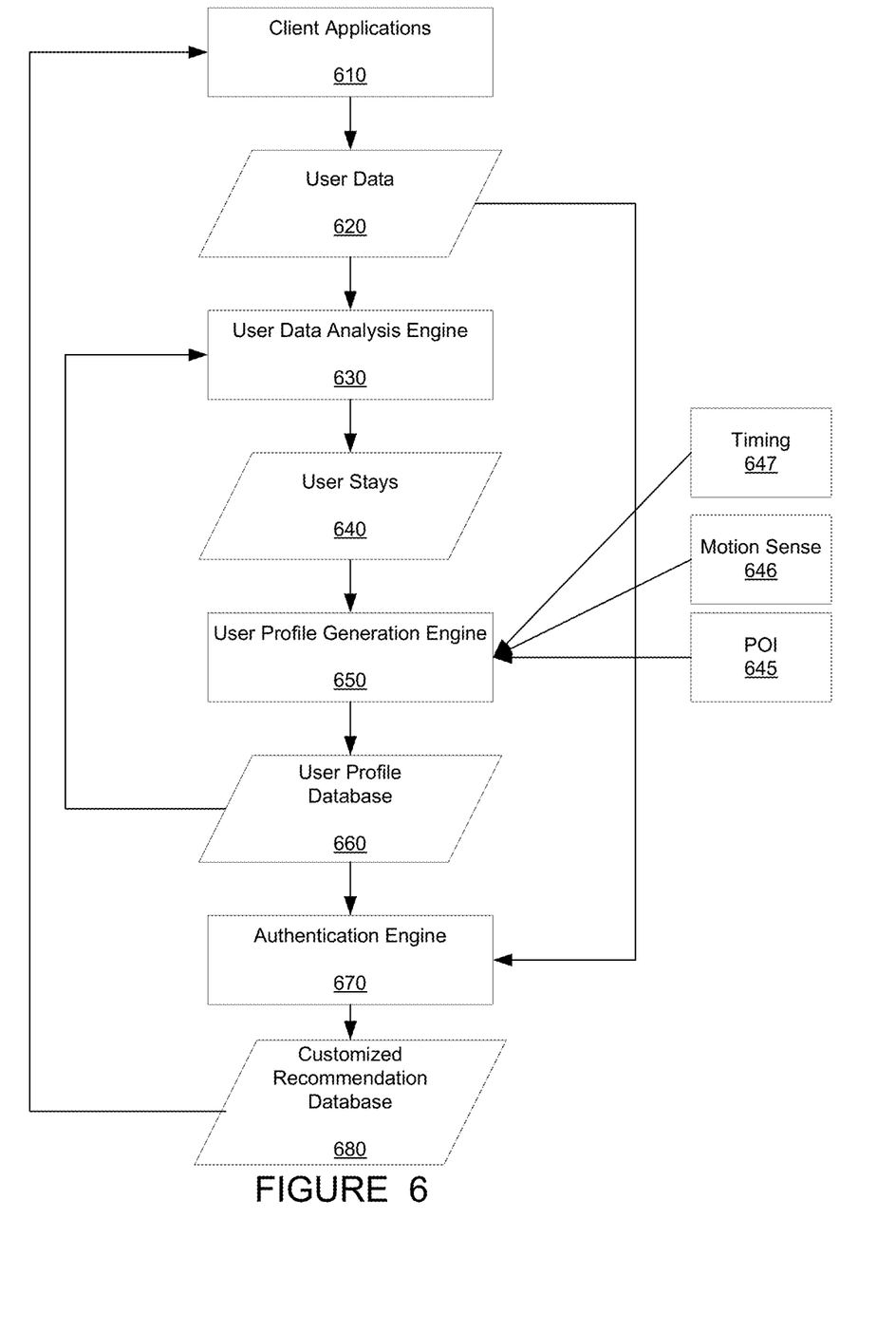
FIG. 6 shows an example of server-side processing, according to an embodiment.

FIG. 6 depicts the general architecture of the system, which collects user data through the Client Applications (610) running on the mobile device, stores the user data in the User Data Database (620), determines the user's user stays through the User Data Analysis Engine (630) based on the user data and previous user profile stored in the User Profile Database (660), stores the user stay results in the user stay Database (640), runs the User Profile Generation Engine (650) (which accesses Points of Interest from a POI Database 645), receives the motion sensing 646 and user timing information 647, and generates the user profiles and stores them in the User Profile Database (660), authenticates a present user with an Authentication engine 670 based on the user profile, and finally presents the customized recommendation to the user through the Client Applications (610).

Figure 7:
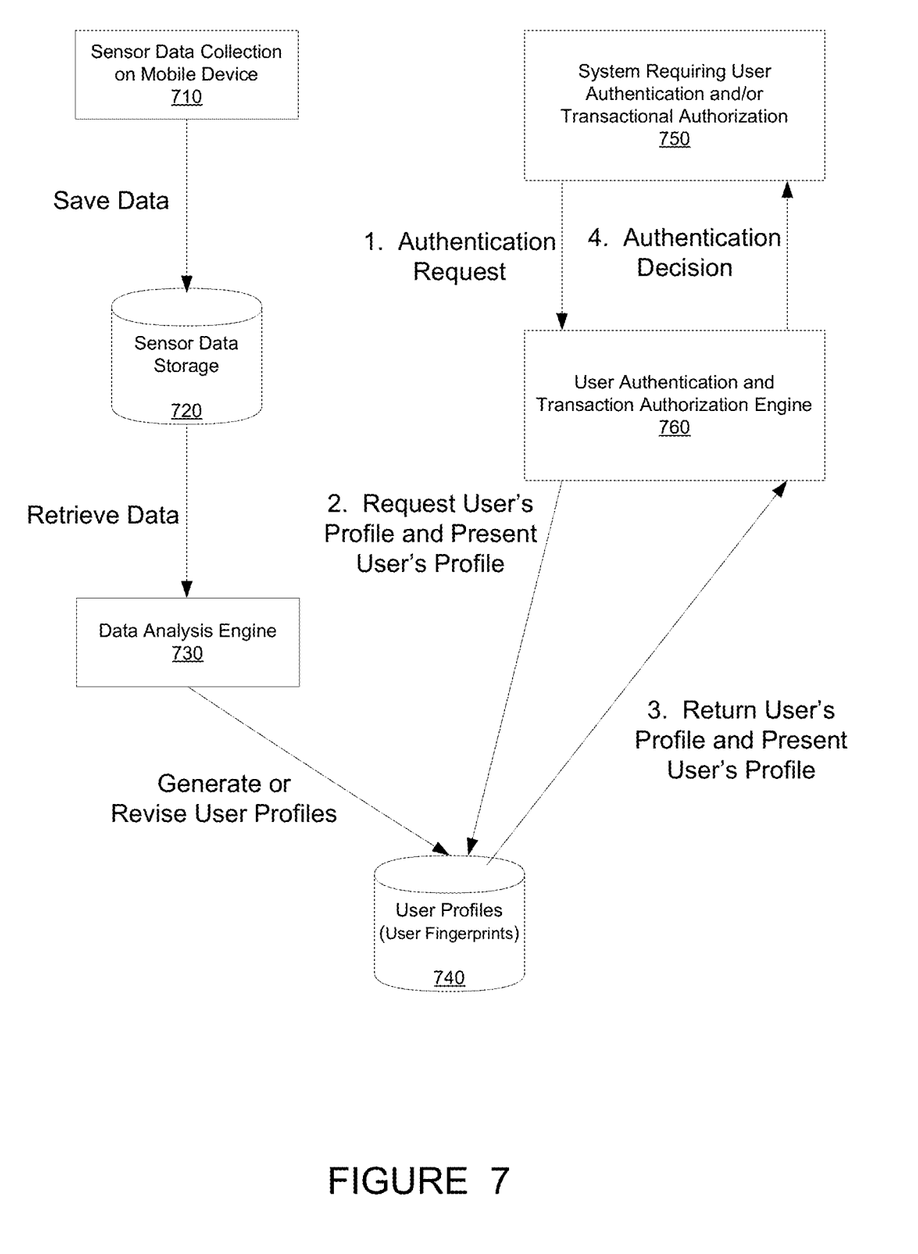
FIG. 7 shows a block diagram of operation of a user profile generation and present user authentication system, according to an embodiment.

FIG. 7 shows a block diagram of operation of a user profile generation and present user authentication system, according to an embodiment. As shown, sensor data is collected on the mobile device 710. As previously described, the mobile device provides many types of available sensors for data collection, such as, location sensors, motions sensors, and temporal sensors. Clearly, this is not an exhaustive list. Additionally, the sensor information can be supplemented by non-sensor information such as behavior of the user of the mobile device, such as, keystrokes, order of keystrokes, accounts visited, the order in which the accounts are visited, websites visited and/or the order in which websites are visited. Again, this is not an exhaustive list.

The sensor information and/or other information in then stored in sensor data storage 720. A data analysis engine 730 processes the sensor and other information for generation of the user profiles which are stored in a user profiles database 740. As has been described, the unique characteristics of the user provides a virtual "fingerprint" of the user which can be used to authenticate a present user as either the user (for example, a registered user, or an owner of the mobile device) or not.

As shown, a system somehow associated with the mobile device or the user of the mobile device requires user authentication and/or transaction authorization 750 and the system starts an authentication process by 1) requesting authentication. A user authentication and transaction authorization engine 760 will then 2) request the user profile and a present user profile. The user profile data base 740 will then 3) return the profiles. The user authentication and transaction authorization engine 760 then performs a comparative analysis to determine a level of confidence that present user is the user. This comparative analysis comprises a statistical analysis to determine similarities and differences between the present user profile and the user profile. Finally, the user authentication and transaction authorization engine 760 returns 4) and authentication decision.

The described embodiments enable mobile devices to build a system or platform of performing value-added security, access control and authentication functions that can increase the probability that fraudulent transactions are blocked and legitimate transactions are authorized. These embodiments reduce both false positives and false negatives of fraud detections. In other words, the described embodiments increase the number and percentage of legitimate transactions, which would be blocked by old systems of fraud detection, and increases the number and percentage of blocked fraudulent transactions, which would be authorized by the old systems.

The described embodiments provide methods and systems of security, access control, and authentication. At least some embodiments include tracking a mobile device user's spatial and temporal data (such as GPS location and speed, cellular network location, Wi-Fi network information, surrounding Bluetooth devices, timestamps associated with each data point), and all kinds of sensor data (such as accelerometer, compass, gyroscope, microphone and ambient light). Further, at least some embodiments include identifying characteristics (fingerprint) of user's behavior patterns inferred by user's data, such as location, place pattern, time pattern (time of day, day of week, or time spent at each place), motion pattern, place sound signatures and light condition, and other related activity patterns. Further, at least some embodiments include approving, authorizing, authenticating and processing identity and/or transactions of the user based on the identified characteristics.

As shown in FIG. 7, at least some embodiments include a data collection system 710 that for at least some embodiments includes a power efficient system that is used to collect all types of sensor data from a mobile device, including location, motion, brightness, temperature, environment sounds, WiFi, Bluetooth, etc., and stores the data in a database. Further, at least some embodiments includes a data analysis system 730 that includes a pipeline of algorithms that are executed to analyze the collected data, extract the characteristics of the user and mobile device, and build the device's/user's behavior profile. For at least some embodiments, the behavior profile is characterized by multiple attributes, including location pattern, including what places do the user usually go to, and in what order. Another attribute includes temporal patterns, such as when the user visits certain places, how often the user visits the places, and how much time the user stays at each place. Another attribute includes motion activity patterns, including vibration pattern, acceleration pattern, speed and frequency of certain movements.

Further, for at least some embodiments an authenticating and authorization system 760 includes a series of verification algorithms are executed to authenticate the user based on the analysis of the user's recent behavior in relation to the user's historical profile, the result of such algorithms are used to determine the authorization of a certain access request.

For at least some embodiments, use and analysis of a mobile device's sensor signal histories, activity/motion patterns, and place visits history to build a unique "fingerprint" of the "pairing" of a mobile device and its authorized user for purposes in mobile device payments systems, credit card payment systems, online payment systems, merchant point of sale systems, computer system access systems, building/room access control systems, and automotive door lock and ignition systems (user identification and authentication, transaction approval/authorization/processing, and fraud detection).

A mobile user's mobile device has a unique accelerometer (and other sensors, such as the light sensor, gyroscope, compass, and altimeter) history, mode of transportation pattern, motion activity pattern, and place visits profile (including location, time of day & time duration)—a set of very unique mobile behavioral fingerprints and footprints.

Use and analysis of a mobile device's accelerometer and its output signals to build unique "fingerprint" of the mobile device within payments and security ecosystems for user identification and authentication, transaction approval/authorization & processing, security, access control, and fraud detection purposes.

The unique mobile behavioral fingerprint can be used to facilitate identification of the mobile device's authorized user, and facilitate the authorization/approval of the authorized user's payment and other transactions, which may otherwise be blocked due to uncertainty about the mobile device user's identity. In other words, mobile behavioral fingerprints and footprints can lower the rate of false red flags in payments, transaction, access control, authentication, fraud detection, and security systems.

Use and analysis of the continuous/persistent location trail and accurate/automatic point of interest (POI) generated by machine learning, predictive analysis and data mining platform allows the building of a user profile that is a unique "fingerprint" for mobile devices used in payments systems, access systems, and automotive door lock & ignition systems (user identification and authentication, transaction, approval, authorization, processing, security, access control, and fraud detection purposes.)

The described embodiment can determine the several unique "fingerprint" identifiers. For example, the speed/cadence/pace at which the mobile user normally walks is a unique biometric signal which can be identified by the accelerometer and GPS. The "bounce" of the mobile device in a person's pocket, bag or purse as they walk or run is a unique biometric signal. The motion trail as a person reaches for their mobile device in a pocket (or purse or briefcase) and moves the device to their ear (and the angle they hold the phone) is a unique biometric pattern, which can be identified by the accelerometer and gyroscope. The history and pattern of the places (and their categories, for example, yoga place, hair salon, Chinese restaurant) a person visits is a unique signal or "fingerprint". The mode of transportation the person uses, and the transportation pattern (time of day, day of week, time duration) and what they were doing before and after, is a unique "fingerprint". The time of day, day of week, and time duration at which the person carries out the activities above is also a unique signal pattern, which can be used to create a "fingerprint" identifier for that person.

An embodiment includes a non-transitory program storage device readable by a machine, tangibly embodying a program of instructions that when downloaded and executed by a mobile device cause the mobile device to perform a method of authenticating a user of a mobile device. For an embodiment, the method includes tracking a plurality of locations of the mobile device, tracking motion behavior of the mobile device, and generating a user profile for the user over a period of time based on the tracked plurality of locations and the tracked motion behavior. A present user of the mobile device is authenticated based on a comparison of the user profile with a present user profile of the present user, wherein the present user profile comprises recent location information of the mobile device and recent motion behavior of the mobile device.

Although specific embodiments have been described and illustrated, the embodiments are not to be limited to the specific forms or arrangements of parts so described and illustrated.

What is claimed:

1. A method of authenticating a user of a mobile device, comprising:
    sensing, by one or more location sensor, a plurality of locations of the mobile device;
    tracking the plurality of locations of the mobile device;
    sensing, by one or more motions sensors, motion of the mobile device;
    tracking motion behavior of the mobile device based on the sensed motion;
    generating a user profile for the user over time based on the tracked plurality of locations and the tracked motion behavior; and
    authenticating a present user of the mobile device based on a comparison of the user profile with a present user profile of the present user, wherein the present user profile is generated later than the user profile, and the present user profile further comprises recent location information of the mobile device and recent motion behavior of the mobile device, wherein the recent location information and the recent motion behavior includes location information and motion information collected within a period of time from a present time, wherein the present time is a time in which the authentication is taking place.

2. The method of claim 1, wherein generating the user profile further comprises:
automatically determining and tracking a plurality of user stays of the user over time without the user proactively or reactively providing input associated with a location or a point of interest for at least one of the plurality of user stays, wherein the plurality of user stays include at least one location, wherein the at least one of the plurality of user stays is detected by clustering user location data continuously collected by the mobile device of the user, and matching the clustered user location data with a nearby point of interest; and wherein
the user profile further comprises location behavior patterns including location transitions detected between different points of interest, user preferred routes between points of interest and frequency and speed of the user between points of interest.

3. The method of claim 1, wherein the user profile further includes tracking of correlations between the tracked location information and the tracked motion information, and wherein authentication further includes comparing the tracked correlations of the user profile with the present user profile.

4. The method of claim 1, wherein the user profile further includes tracking absolute timing of operations of the mobile device, and tracking relative timing of operations of the mobile device.

5. The method of claim 1, further comprising setting a level of security of the mobile device depending upon a level of authentication of the present user.

6. The method of claim 1, further comprising establishing a level of confidence that the present user of the mobile device is the user of the mobile device, thereby providing a confidence level in identifying the present user of the mobile device as the user of the mobile device.

7. The method of claim 6, wherein the greater the level of authentication, the greater the probability the present user is the user.

8. The method of claim 1, wherein the tracking the plurality of location comprises:
tracking user stays of the user over time, wherein the user stays include at least one location.

9. The method of claim 8, wherein sets of user stays are associated with the user.

10. The method of claim 1, wherein the tracking the motion behavior comprises:
at least one motion detector within the mobile device sensing motion of the mobile device over time;
tracking the sensed motion; and
identifying patterns in the sensed motion over time.

11. The method of claim 10, wherein each of the identified patterns are associated with an activity or action of the user.

12. The method of claim 1, wherein generating the user profile for the user over the time period based on the tracked plurality of locations and the tracked motion behavior comprises:
associating sets of locations with the user;
associating sets of motion behavior patterns with the user;
associating sets of combinations of motion patterns with particular locations of the sets of locations.

13. The method of claim 12, wherein the user profile further includes associating timing of operations of the mobile device with the user, wherein the timing includes absolute timing and relative timing.

14. The method of claim 13, wherein authenticating a present user of the mobile device based on a comparison of the user profile with the present user profile comprises:
determining location matches between the user profile and the present user profile;
determining motion matches between the user profile and the present user profile;
determining combination matches between the combinations of motion patterns with particular locations of user profile and the present user profile;
and
determining a level of authentication based on the location matches, the motion matches, and the combination matches.

15. The method of claim 14, wherein determining location matches between the user profile and the present user profile comprises determining a relative POI category match between the POI categories of the user profile and the present user profile.

16. The method of claim 14, further comprising weighting a contribution of the location matches, the motion matches, and the combination matches in determination of the level of authentication.

17. The method of claim 15, wherein the weighting of each of the location matches, the motion matches, and the combination matches is adaptive adjusted.

18. A mobile device, comprising:
one or more location sensors configured to sense a plurality of locations of the mobile device;
one or more motion sensors configured to sense motion of the mobile device;
a processor operative to:
receive location information from the one or more location sensors;
receive motion information from the one or more motion sensors;
track a plurality of locations of the mobile device;
track motion behavior of the mobile device;
generate a user profile for the user over time based on the tracked plurality of locations and the tracked motion behavior, or provide the tracked plurality of location and the tracked motion behavior to a server, allowing the server to generate the user profile for the user over time; and
authenticate a present user of the mobile device based on a comparison of the user profile with a present user profile of the present user, or enable the server to authenticate the present user of the mobile device, wherein the present user profile is generated later than the user profile, and the present user profile further comprises recent location information of the mobile device and recent motion behavior of the mobile device, wherein the recent location information and the recent motion behavior includes location information and motion information collected within a period of time from a present time, wherein the present time is a time in which the authentication is taking place.

19. A wireless system for authenticating a user of a mobile device, comprising:
at least a mobile device and a network including a server operative to receive at least one input from one or more location sensors and one or more motion sensors, and track locations and motion of the user device over time; and at least one of the mobile device or a server connected to the network are operative to:

track a plurality of locations of the mobile device; track motion behavior of the mobile device;

generate a user profile for the user over a period of time based on the tracked plurality of locations and the tracked motion behavior; and authenticate a present user of the mobile device based on a comparison of the user profile with a present user profile of the present user, or enable the server to authenticate the present user of the mobile device, wherein the present user profile is generated later than the user profile, and the present user profile further comprises recent location information of the mobile device and recent motion behavior of the mobile device, wherein the recent location information and the recent motion behavior includes location information and motion information collected within a period of time from a present time, wherein the present time is a time in which the authentication is taking place.

* * * * *